June 7, 1966  S. BRAUN  3,254,787
MOLDED PLASTIC CONTAINER
Filed Oct. 24, 1963  3 Sheets-Sheet 1
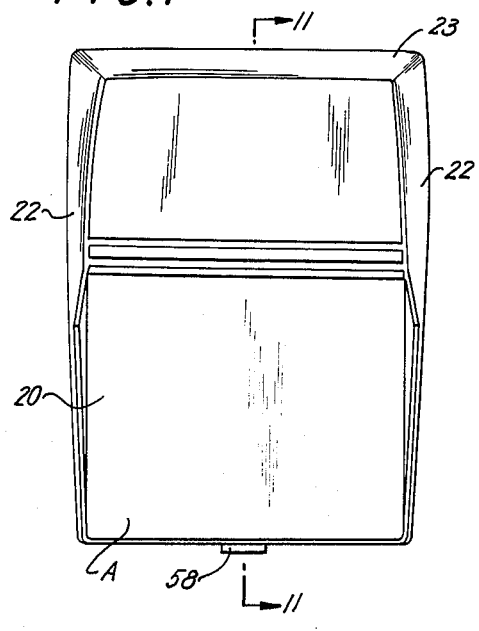
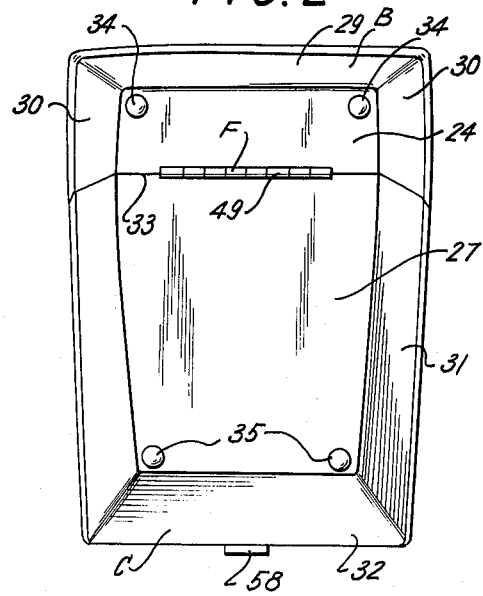
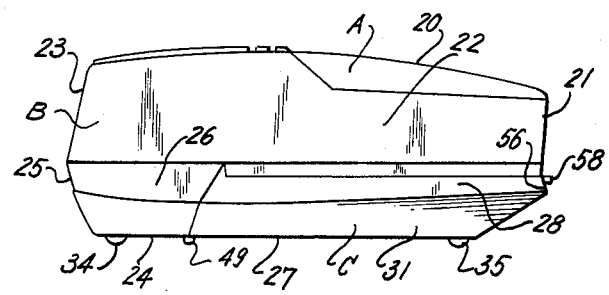
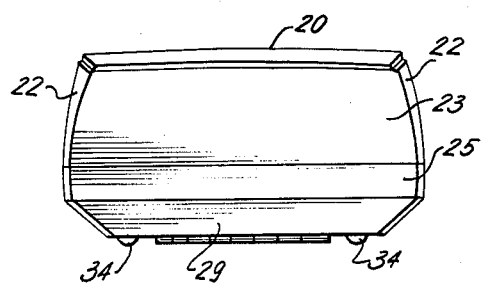
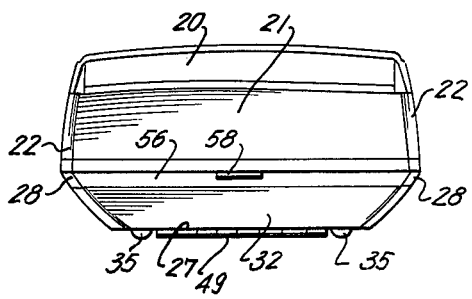
INVENTOR.
SAMUEL BRAUN
BY
ATTORNEY June 7, 1966 S. BRAUN 3,254,787
MOLDED PLASTIC CONTAINER
Filed Oct. 24, 1963 3 Sheets-Sheet 2

INVENTOR.
SAMUEL BRAUN
BY
*Ann Reece*
ATTORNEY

June 7, 1966  S. BRAUN  3,254,787
MOLDED PLASTIC CONTAINER
Filed Oct. 24, 1963  3 Sheets-Sheet 3
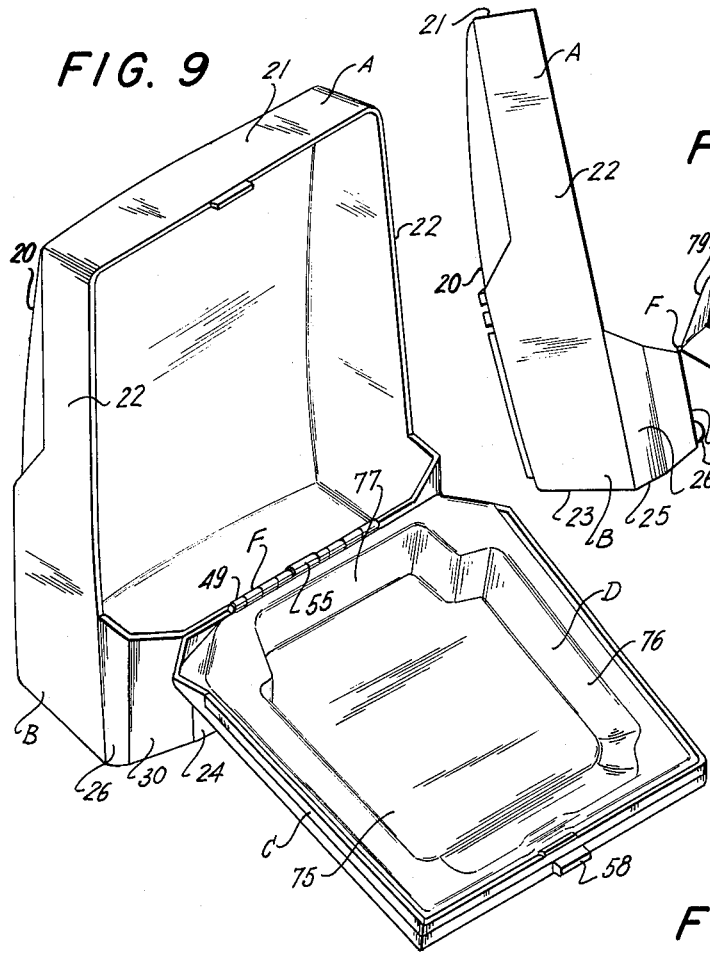
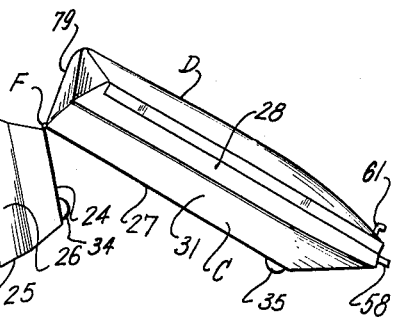
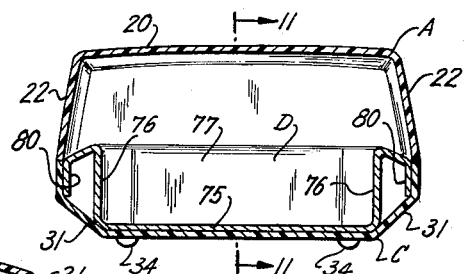
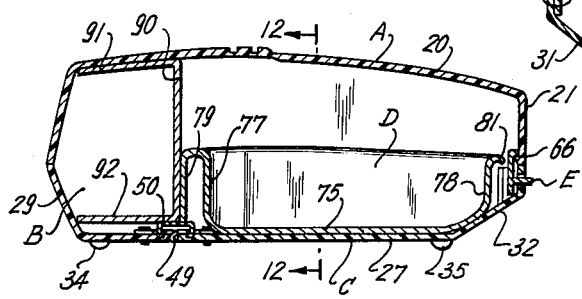
INVENTOR.
SAMUEL BRAUN
BY
ATTORNEY

United States Patent Office 3,254,787
Patented June 7, 1966

3,254,787
MOLDED PLASTIC CONTAINER
Samuel Braun, Rye, N.Y., assignor to B.C.N. Design Products Inc., Middle Village, N.Y., a corporation of New York
Filed Oct. 24, 1963, Ser. No. 318,674
4 Claims. (Cl. 220—31)

The present invention relates to a molded container and it particularly relates to a molded container having a shaver construction.

It is among the objects of the present invention to provide a molded plastic container which will serve both for displaying and merchandising the shaver as well as a carrier for the shaver for the consumer.

Another object is to provide a simple attractive hinge layer construction having a shaver which will have a spring loaded snap closure device holding the box firmly closed against inadvertent opening thereof.

Another object is to provide a novel molded plastic container for a shaver which will have a base enclosure for carrying the shaver as well as a rear auxiliary container for receiving accessories for the shaver.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one preferred embodiment of the present invention, it has been found most satisfactory to provide a base container element as well as a cover element which are hinged together by a transverse hinge.

This transverse hinge will extend across the bottom of the container adjacent the rear thereof so that the rear portion of the cover element will serve as an auxiliary cotnainer and the base section will serve to receive the shaver itself for display or use.

The base receptacle portion or container portion desirably has a removable tray in which the shaver is carried.

The rear edge of the base is provided with a C-shaped spring hinge construction which will limit the opening movement to an angle of about 100° to 105°.

The front of the container is desirably recessed where it receives a spring pressed latch arrangement permitting positive opening and latching thereof.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top plan view of a molded plastic container according to the present invention.

FIG. 2 is a bottom plan view.

FIG. 3 is a side elevational view.

FIG. 4 is a front elevational view.

FIG. 5 is a rear elevational view.

FIG. 9 is a top perspective view of the arrangement shown in FIG. 6 with the tray in position in the base container section.

FIG. 10 is a side elevational view of the arrangement shown in FIG. 9.

FIG. 11 is a longitudinal sectional view showing the box with the tray in position.

FIG. 12 is a transverse sectional view of the box with the tray in position.

Referring to the figures, there is shown a cover section A with a rear auxiliary container section B and a base container section C.

The base container section C is designed to receive the tray D which will hold the shaver for display or usage as indicated in FIGS. 9 and 10.

Figure 8:
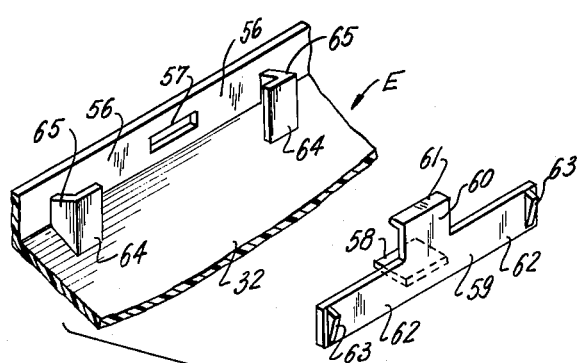
FIG. 8 is a separated view of the latch arrangement.
Figure 6:
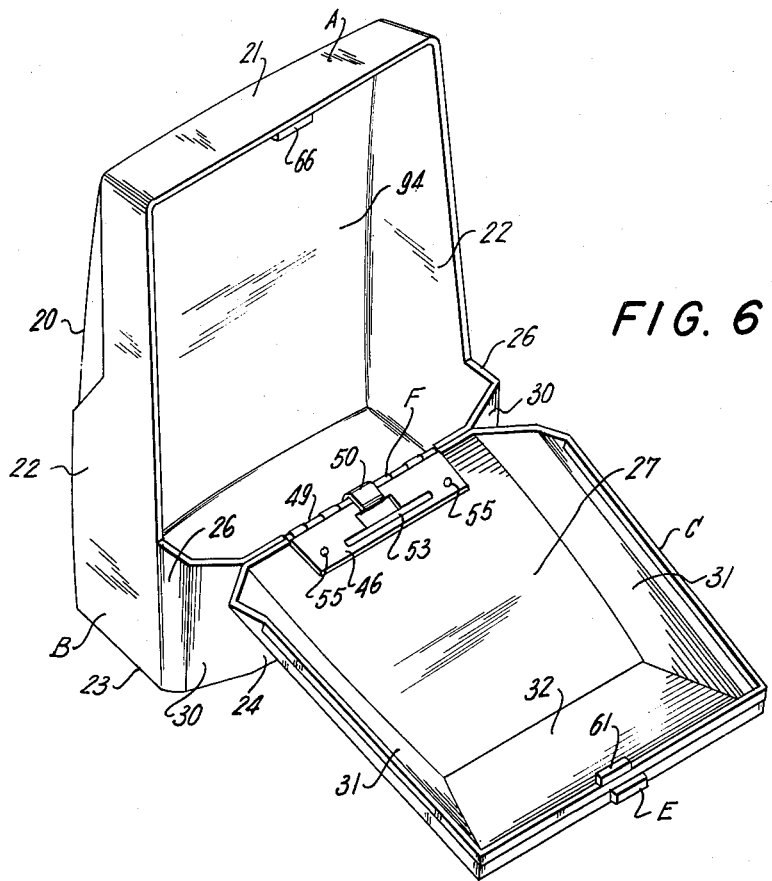
FIG. 6 is a top perspective view showing the box in open position with the cover element serving as a stand.

The latch arrangement E as shown in FIG. 8 by itself and in the container in FIGS. 6 and 11 will be mounted open in the forward edge of the container section C.

Figure 7:
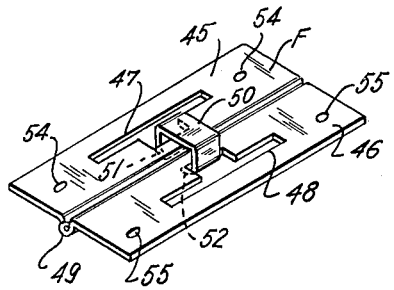
FIG. 7 is a top perspective view of the hinge arrangement removed from the box.

The hinge F is shown by itself in FIG. 7 in perspective and is shown in the container in FIG. 9.

Referring to the figures, the cover section A has a top curved wall 20 with depending front wall 21, side walls 22 and a back wall 23.

To the rear of the hinge F, the auxiliary rear container section B has the bottom wall 24, the rear wall 25 and the side walls 26.

The container section itself has a bottom wall 27 and the side walls 28.

The bottom of the container is best shown in FIG. 2 and has the upwardly inclined side walls 29 and 30 on the rear auxiliary container section B and 31 and 32 on the forward base receptacle C.

The base of the container is split as indicated at 33.

The hinge structure F will extend transversely across as indicated best in FIGS. 2, 6 and 9 so that the bottom of the container will have a short bottom wall 24 constituting part of the cover and a relatively longer bottom wall 27 constituting part of the base receptacle C.

The rear section 24 will have the short legs 34 and the base receptacle C will have the short legs 35 for support when the container is closed as indicated best in FIGS. 3 and 4.

The hinge structure is best shown in FIG. 7 and consists of the plates 45 and 46 having the T-shaped cut-outs 47 and 48 with the hinge pin structure at 49 which will project above the bottom walls 24 and 27 but being held out of contact by the legs 34 and 35.

The C-shaped spring 50 will have its inturned end portions 51 and 52 as shown in FIG. 7 extending into and under the plates 45 and 46 at the ends of the legs of the T-openings 47 and 48, and this C-shaped spring 50 will limit the opening of the cover element A from the receptacle element or container element C as indicated in FIGS. 6 and 9 to 100° to 105°.

The plastic material of the cover A and the base receptacle C will have upstanding portions or a projecting ridge 53 extending up into the cross members of the T as shown in FIG. 6.

The hinge is also provided with eye openings 54 and 55 through which eyelets will extend attaching the hinge plates 45 and 46 firmly to the bottom walls 24 and 27.

The forward part of the plastic container has a latch arrangement as shown best in FIG. 8.

The front wall 56 of the lower base receptacle C has a slot 57 through which projects the finger press element 58 integrally molded with the plastic strip 59.

The plastic strip 59 has the upstanding lug 60 with the latch claw 61 and has the outstanding arm portions 62 with the rearwardly projecting angle members 63.

The angle members 63 are designed to fit inside the rear flanges 64 of the angle members 65 which extend inwardly from and are molded integrally with the front wall 56.

The upper forward wall 21 of the cover element A will have an inwardly directed lug or projection 66 (see FIG.

11) which will engage said latch claw 61 with the resiliency of tht plastic arm element 62 causing such engagement to lock the cover A upon the base receptacle C.

The tray element D as shown best in FIGS. 9, 11 and 12 has a bottom wall 75 with the side wall 76 the rear wall 77 and the forward wall 78 to form the receptacle portion which receive the shaver.

The tray is held in position by the back flange 79 which is positioned inside of the hinge F as well as the downwardly extending side flanges 80 and the front extension 81.

This tray will conveniently fit into the lower container section C and will conceal both the hinge structure F as well as the latch structure E.

The box when opened as shown in FIGS. 6 and 9 will display the shaver on the tray D in a most advantageous position for merchandising and it may also be used as a carrier for the shaver by the consumer.

The latching arrangement as shown in FIG. 8 will assure positive closure upon the base receptacle C and the auxiliary rear element B may receive accessories.

The rear portion may be enclosed by an enclosure 90 having the flange portions 91 and 92 resting upon the inside of the top wall 20 of the cover as well as the inside of the bottom wall 24.

The finger cut-out 93 enables ready removal of the enclosure 90 to obtain access to the accessories.

It will be noted that the front walls 21 of the cover and 56 of the base container are inwardly inclined so that the element 58 is recessed and cannot be pressed all the way home to release the latch by inadvertent contact.

This will assure that the container will not be inadvertently opened.

The interior 94 of the cover may be suitably lined or covered and carry instructions or the trademark.

It is thus apparent that the present applicant has provided a novel molded plastic container for an electrical shaver.

As many changes could be made in the above molded plastic container, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A hinged molded plastic container for a shaver and the like having swinging cover with an auxiliary rear receptacle and stand portion, a base receptacle, a transverse hinge along the bottom of the container hinging said cover and receptacle together and a plastic spring latch at the front of the container to latch together the cover and base receptacle, said plastic spring latch consisting of an integrally molded horizontally extending thin bar of plastic with rearwardly and inwardly extending vertical triangular wedges on the ends of the bar and two forwardly extending horizontal upper and lower lips from the middle center and top center of the bar on the opposite side from said triangular wedges, said upper lip serving to engage and latch the swinging cover and said lower lip serving to project through the front of the base receptacle and act as a manual release.

2. A hinged molded plastic container for a shaver and the like having swinging cover with an auxiliary rear receptacle and stand portion, a base receptacle, a transverse hinge along the bottom of the container hinging said cover and receptacle together and a plastic spring latch at the front of the container to latch together the cover and base receptacle, said hinge being positioned adjacent the rear of the container so that the bottom wall of the container will have a relatively small portion forming part of the cover and a relatively large portion forming part of the base receptacle, said plastic spring latch consisting of an integrally molded horizontally extending thin bar of plastic with rearwardly and inwardly extending vertical triangular wedges on the ends of the bar and two forwardly extending horizontal upper and lower lips from the middle center and top center of the bar on the opposite side from said triangular wedges, said upper lip serving to engage and latch the swinging cover and said lower lip serving to project through the front of the base receptacle and act as a manual release.

3. A hinged molded plastic container for a shaver and the like having swinging cover with an auxiliary rear receptacle and stand portion, a base receptacle, a transverse hinge along the bottom of the container hinging said cover and receptacle together and a plastic spring latch at the front of the container to latch together the cover and base receptacle, said hinge structure having a C-shaped spring associated therewith to limit the opening thereof to about 100° to 105°, said plastic spring latch consisting of an integrally molded horizontally extending thin bar of plastic with rearwardly and inwardly extending vertical triangular wedges on the ends of the bar and two forwardly extending horizontal upper and lower lips from the middle center and top center of the bar on the opposite side from said triangular wedges, said upper lip serving to engage and latch the swinging cover and said lower lip serving to project through the front of the base receptable and act as a manual release.

4. A hinged molded plastic container for a shaver and the like having swinging cover with an auxiliary rear receptacle and stand portion, a base receptacle, a transverse hinge along the bottom of the container hinging said cover and receptacle together and a plastic spring latch at the front of the container to latch together the cover and base receptacle, said hinge structure being of such structure so as to cause the cover to stand upright when opened with the base receptacle inclined upwardly and forwardly so as to form a display platform, said plastic spring latch consisting of an itnegrally molded horizontally extending thin bar of plastic with rearwardly and inwardly extending vertical triangular wedges on the ends of the bar and two forwardly extending horizontal upper and lower lips from the middle center and top center of the bar on the opposite side from said triangular wedges, said upper lip serving to engage and latch the swinging cover and said lower lip serving to project through the front of the base receptacle and act as a manual release.

References Cited by the Examiner

UNITED STATES PATENTS

| 2,600,087 | 6/1952 | Vogel | 206—16 |
| 2,605,925 | 8/1952 | Morin | 220—35 |
| 2,804,229 | 8/1957 | Bergh et al. | 220—31 |
| 2,807,355 | 9/1957 | Shiffman | 206—45.2 |
| 2,873,876 | 2/1959 | Reitzel | 220—35 |

THERON E. CONDON, *Primary Examiner.*

W. T. DIXSON, *Assistant Examiner.*